US006556967B1

(12) United States Patent
Nelson et al.

(10) Patent No.: US 6,556,967 B1
(45) Date of Patent: Apr. 29, 2003

(54) VOICE ACTIVITY DETECTOR

(75) Inventors: Douglas J. Nelson; David C. Smith; Jeffrey L. Townsend, all of Columbia, MD (US)

(73) Assignee: The United States of America as represented by the National Security Agency, Washington, DC (US)

( * ) Notice: Subject to any disclaimer, the term of this patent is extended or adjusted under 35 U.S.C. 154(b) by 0 days.

(21) Appl. No.: 09/266,811

(22) Filed: Mar. 12, 1999

(51) Int. Cl.[7] ................................................ G10L 15/20

(52) U.S. Cl. ........................ 704/233; 704/226; 704/227; 704/228; 704/208; 704/214

(58) Field of Search ................................. 704/233, 226, 704/227, 228, 214, 208

(56) References Cited

U.S. PATENT DOCUMENTS

| | | | | | |
|---|---|---|---|---|---|
| 4,351,983 | A | | 9/1982 | Crouse et al. | |
| 4,672,669 | A | | 6/1987 | DesBlache et al. | |
| 5,012,519 | A | * | 4/1991 | Adlersberg et al. | 704/226 |
| 5,255,340 | A | | 10/1993 | Arnaud et al. | |
| 5,276,765 | A | | 1/1994 | Freeman et al. | |
| 5,323,337 | A | * | 6/1994 | Wilson et al. | 704/226 |
| 5,459,814 | A | | 10/1995 | Gupta et al. | |
| 5,533,118 | A | | 7/1996 | Cesaro et al. | |
| 5,586,180 | A | * | 12/1996 | Degenhardt et al. | 379/388.04 |
| 5,598,466 | A | | 1/1997 | Graumann | |
| 5,611,019 | A | * | 3/1997 | Nakatoh et al. | 704/233 |
| 5,619,565 | A | | 4/1997 | Cesaro et al. | |
| 5,619,566 | A | | 4/1997 | Fogel | |
| 5,649,055 | A | | 7/1997 | Gupta et al. | |
| 5,657,422 | A | * | 8/1997 | Janiszewski et al. | 704/229 |
| 5,706,394 | A | * | 1/1998 | Wynn | 704/219 |
| 5,732,141 | A | | 3/1998 | Chaoui et al. | |
| 5,735,716 | A | * | 4/1998 | Bergstrom et al. | 704/202 |
| 5,737,407 | A | | 4/1998 | Graumann | |
| 5,749,067 | A | | 5/1998 | Barrett | |
| 5,809,459 | A | * | 9/1998 | Bergstrom et al. | 704/223 |
| 5,826,230 | A | * | 10/1998 | Reaves | 704/233 |
| 5,867,574 | A | | 2/1999 | Erylimaz | |
| 5,907,824 | A | * | 5/1999 | Tzirkel-Hancock | 704/242 |
| 5,963,901 | A | * | 10/1999 | Vahatalo et al. | 704/233 |
| 5,991,718 | A | * | 11/1999 | Malah | 704/233 |
| 6,061,647 | A | * | 5/2000 | Barrett | 704/208 |
| 6,182,035 | B1 | * | 1/2001 | Mekuria | 704/236 |

* cited by examiner

*Primary Examiner*—Vijay B Chawan
(74) *Attorney, Agent, or Firm*—Robert D. Morelli

(57) ABSTRACT

The present invention is a device for and method of detecting voice activity by receiving a signal; computing the absolute value of the signal; squaring the absolute value; low pass filtering the squared result; computing the mean of the filtered signal; subtracting the mean from the filtered result; padding the mean subtracted result with zeros to form a value that is a power of two if the result is not already a power of two; computing a DFFT of the power of two result; normalizing the DFFT result of the last step; computing a mean of the normalization; computing a variance of the normalization; computing a power ratio of the normalization; classifying the mean, variance and power ratio as speech or non-speech based on how this feature vector compares to similarly constructed feature vectors of known speech and non-speech. The voice activity detector includes an absolute value squarer; a low pass filter; a mean subtractor; a zero padder; a DFFT; a normalizer; and a classifier.

12 Claims, 3 Drawing Sheets

VOICE ACTIVITY DETECTOR

FIELD OF THE INVENTION

The present invention relates, in general, to data processing and, in particular, to speech signal processing for identifying voice activity.

BACKGROUND OF THE INVENTION

A voice activity detector is useful for discriminating between speech and non-speech (e.g., fax, modem, music, static, dial tones). Such discrimination is useful for detecting speech in a noisy environment, compressing a signal by discarding non-speech, controlling communication devices that only allow one person at a time to speak (i.e., half-duplex mode), and so on.

A voice activity detector may be optimized for accuracy, speed, or some compromise between the two. Accuracy often means maximizing the rate at which speech is identified as speech and minimizing the rate at which non-speech is identified as speech. Speed is how much time it takes a voice activity detector to determine if a signal is speech or non-speech. Accuracy and speed work against each other. The most accurate voice activity detectors are often the slowest because they analyze a large number of features of the signal using computationally complex methods. The fastest voice activity detectors are often the least accurate because they analyze a small number of features of the signal using computationally simple methods. The primary goal of the present invention is accuracy.

Many prior art voice activity detectors only do a good job of distinguishing speech from one type of non-speech using one type of discriminator and do not do as well if a different type of non-speech is present. For example, the variance of the delta spectrum magnitude is an excellent discriminator of speech vs. music but it not a very good discriminator of speech vs. modem signals or speech vs. tones. Blind combination of specific discriminators does not lead to a general solution of speech vs. non-speech. A dimension reduction technique such as principal components reduction may be used when a large number of discriminators are analyzed in an attempt to compress the data according to signal variance. Unfortunately, maximizing variance may not provide good discrimination.

Over the past few years, several voice activity detectors have been in use. The first of these is a simple energy detection method, which detects increases in signal energy in voice grade channels. When the energy exceeds a threshold, a signal is declared to be present. By requiring that the variance of the energy distribution also exceed a threshold, the method may be used to distinguish speech from several types of non-speech.

FIG. 1 is an illustration of a voice activity detection method called the readability method 1. It is a variation of the energy method. A signal is filtered 2 by a pre-whitening filter. An autocorrelation 3 is performed on the pre-whitened signal. The peak in the autocorrelated signal is then detected 4. The peak is then determined to be within the expected pitch range 5 (i.e., speech) or not 6 (i.e., non-speech). Speech is declared to be present if a bulge occurs in the correlation function within the expected periodicity range for the pitch excitation function of speech. The readability method is similar to the energy method since detection is based on energy exceeding a threshold. The readability method 1 performs better that the energy method because the readability method 1 exploits the periodicity of speech. However, the readability method does not perform well if there are changes in the gain, or dynamic range, of the signal. Also, the readability method identifies non-speech as speech when non-speech exhibits periodicity in the expected pitch range (i.e., 75 to 400 Hz.). The pre-whitening filter removes un-modulated tones (i.e., non-speech) to prevent such tones from being identified as speech. However, such a filter does not remove other non-speech signals (e.g., modulated tones and FM signals) which may be present in a channel carrying speech. Such non-speech signals and may be falsely identified as speech.

FIG. 2 is an illustration of the NP method 20 which detects voice activity by estimating the signal to noise ratio (SNR) for each frame of the signal. A Fast Fourier Transform (FFT) is performed on the signal and the absolute value of the result is squared 21. The result of the last step is then filtered to remove un-modulated tones using a pre-whitening filter 22. The variance in the result of the last step is then determined 23. The result of the last step is then limited to a band of frequencies in which speech may occur 24. The power spectrum of each frame is computed and sorted 25 into either high energy components or low energy components. High energy components are assumed to be signal (speech which may include non-speech) or interference (non-speech) while low energy components are assumed to be noise (all non-speech). The highest energy components are discarded. The signal power is then estimated from the remaining high energy components 26. The noise power is estimated by averaging the low-energy components 27. The signal power is then divided by the noise power 28 to produce the SNR. The SNR is then compared to a user-definable threshold to determine whether or not the frame of the signal is speech or non-speech. Signal detection in the NP method is based on a power ratio measurement and is, therefore, not sensitive to the gain of the receiver. The fundamental assumption in the NP method is that spectral components of speech are sparse.

FIG. 3 illustrates a voice activity detector method named TALKATIVE 30 which detects speech by estimating the correlation properties of cepstral vectors. The assumption is that non-stationarity (a good discriminator of speech) is reflected in cepstral coefficients. Vectors of cepstral coefficients are computed in a frame of the signal 31. Squared Euclidean distances between cepstral vectors are computed 32. The squared Euclidean distances are time averaged 33 within the frame in order to estimate the stationarity of the signal. A large time averaged value indicates speech while a small time averaged value indicates a stationary signal (i.e., non-speech). The time averaged value is compared to a user-definable threshold 34 to determine whether or not the signal is speech or non-speech. The TALKATIVE method performs well for most signals, but does not perform well for music or impulsive signals. Also, considerable temporal smoothing occurs in the TALKATIVE method.

U.S. Pat. No. 4,351,983, entitled "SPEECH DETECTOR WITH VARIABLE THRESHOLD," discloses a device for and method of detecting speech by adjusting the threshold for determining speech on a frame by frame basis. U.S. Pat. No. 4,351,983 is hereby incorporated by reference into the specification of the present invention.

U.S. Pat. No. 4,672,669, entitled "VOICE ACTIVITY DETECTION PROCESS AND MEANS FOR IMPLEMENTING SAID PROCESS," discloses a device for and method of detecting voice activity by comparing the energy of a signal to a threshold. The signal is determined to be voice if its power is above the threshold. If its power is below the threshold then the rate of change of the spectral parameters is tested. U.S. Pat. No. 4,672,669 is hereby incorporated by reference into the specification of the present invention.

U.S. Pat. No. 5,255,340, entitled "METHOD FOR DETECTING VOICE PRESENCE ON A COMMUNICATION LINE," discloses a method of detecting voice activity by determining the stationary or non-stationary state of a block of the signal and comparing the result to the results of the last M blocks. U.S. Pat. No. 5,255,340 is hereby incorporated by reference into the specification of the present invention.

U.S. Pat. No. 5,276,765, entitled "VOICE ACTIVITY DETECTION," discloses a device for and a method of detecting voice activity by performing an autocorrelation on weighted and combined coefficients of the input signal to provide a measure that depends on the power of the signal. The measure is then compared against a variable threshold to determine voice activity. U.S. Pat. No. 5,276,765 is hereby incorporated by reference into the specification of the present invention.

U.S. Pat. Nos. 5,459,814 and 5,649,055, both entitled "VOICE ACTIVITY DETECTOR FOR SPEECH SIGNALS IN VARIABLE BACKGROUND NOISE," discloses a device for and method of detecting voice activity by measuring short term time domain characteristics of the input signal, including the average signal level and the absolute value of any change in average signal level. U.S. Pat. Nos. 5,459,814 and 5,649,055 are hereby incorporated by reference into the specification of the present invention.

U.S. Pat. Nos. 5,533,118 and 5,619,565, both entitled "VOICE ACTIVITY DETECTION METHOD AND APPARATUS USING THE SAME," discloses a device for and method of detecting voice activity by dividing the square of the maximum value of the received signal by its energy and comparing this ratio to three different thresholds. U.S. Pat. Nos. 5,533,118 and 5,619,565 are hereby incorporated by reference into the specification of the present invention.

U.S. Pat. Nos. 5,598,466 and 5,737,407, both entitled "VOICE ACTIVITY DETECTOR FOR HALF-DUPLEX AUDIO COMMUNICATION SYSTEM," discloses a device for and method of detecting voice activity by determining an average peak value, a standard deviation, updating a power density function, and detecting voice activity if the average peak value exceeds the power density function. U.S. Pat. Nos. 5,598,466 and 5,737,407 are hereby incorporated by reference into the specification of the present invention.

U.S. Pat. No. 5,619,566, entitled "VOICE ACTIVITY DETECTOR FOR AN ECHO SUPPRESSOR AND AN ECHO SUPPRESSOR," discloses a device for detecting voice activity that includes a whitening filter, a means for measuring energy, and using the energy level to determine the presence of voice activity. U.S. Pat. No. 5,619,566 is hereby incorporated by reference into the specification of the present invention.

U.S. Pat. No. 5,732,141, entitled "DETECTING VOICE ACTIVITY," discloses a device for and method of detecting voice activity by computing the autocorrelation coefficients of a signal, identifying a first autocorrelation vector, identifying a second autocorrelation vector, subtracting the first autocorrelation vector from the second autocorrelation vector, and computing a norm of the differentiation vector which indicates whether or not voice activity is present. U.S. Pat. No. 5,732,141 is hereby incorporated by reference into the specification of the present invention.

U.S. Pat. No. 5,749,067, entitled "VOICE ACTIVITY DETECTOR," discloses a device for and method of detecting voice activity by comparing the spectrum of the a signal to a noise estimate, updating the noise estimate, computing a linear predictive coding prediction gain, and suppressing updating the noise estimate if the gain exceeds a threshold. U.S. Pat. No. 5,749,067 is hereby incorporated by reference into the specification of the present invention.

U.S. Pat. No. 5,867,574, entitled "VOICE ACTIVITY DETECTION SYSTEM AND METHOD," discloses a device for and method of detecting voice activity by computing an energy term based on an integral of the absolute value of a derivative of a speech signal, computing a ration of the energy to a noise level, and comparing the ratio to a voice activity threshold. U.S. Pat. No. 5,867,574 is hereby incorporated by reference into the specification of the present invention.

SUMMARY OF THE INVENTION

It is an object of the present invention to detect voice activity in a signal.

It is another object of the present invention to detect voice activity in a signal by squaring the absolute value of a signal, finding the low frequency components of the signal known as an AM envelope, subtracting the mean of the AM envelope from the AM envelope, padding the result with zeros if the result is not a power of two, transform the result using a Discreet Fast Fourier Transform, normalizing the result, computing a feature vector, and determining the presence of voice activity using Quadratic Discriminant Analysis.

It is another object of the present invention to remove music signals by observing threshold crossings of the AM envelope of the signal.

The present invention is a device for and method of detecting voice activity. A segment of a signal is received at an absolute value squarer, which computes the absolute value of the segment and then squares it.

The absolute value squarer is connected to a low pass filter, which blocks high frequency components of the output of the absolute value squarer and passes low frequency components of the output of the absolute value squarer.

The low pass filter is connected to a mean subtractor, which receives the AM envelope of the segment, computes the mean of the AM envelop and subtracts the mean of the AM envelope from the AM envelope.

The mean subtractor is connected to a zero padder, which pads the result of the mean subtractor with zeros to form a value that is a power of two.

The zero padder is connected to a Digital Fast Fourier Transformer (DFFT), which performs a Digital Fast Fourier Transform on the output of the zero padder.

The DFFT is connected to a normalizer, which computes a normalized magnitude vector of the DFFT of the AM envelope, computes the mean of the normalized magnitude vector, computes the variance of the normalized magnitude vector, and computes the power ratio of the normalized magnitude vector.

The normalizer is connected to a classifier, which receives the mean, variance, and power ratio of the normalizer magnitude vector and compares these features to models of similar features precomputed for known speech and known non-speech to determine whether the unknown segment received is speech or non-speech.

Alternate embodiments of the present invention may be realized by adding a threshold-crossing detector between the low pass filter and the mean subtractor to identify music as non-speech.

DETAILED DESCRIPTION

Figure 1:
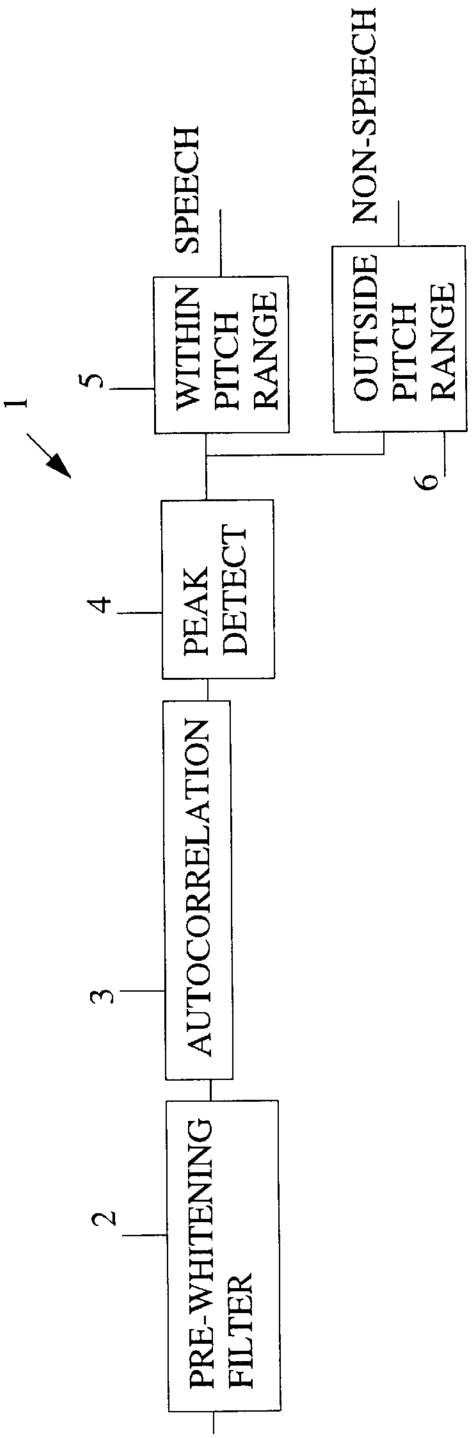
FIG. 1 (PRIOR ART)
FIG. 1 is an illustration of the prior art readability method.
Figure 2:
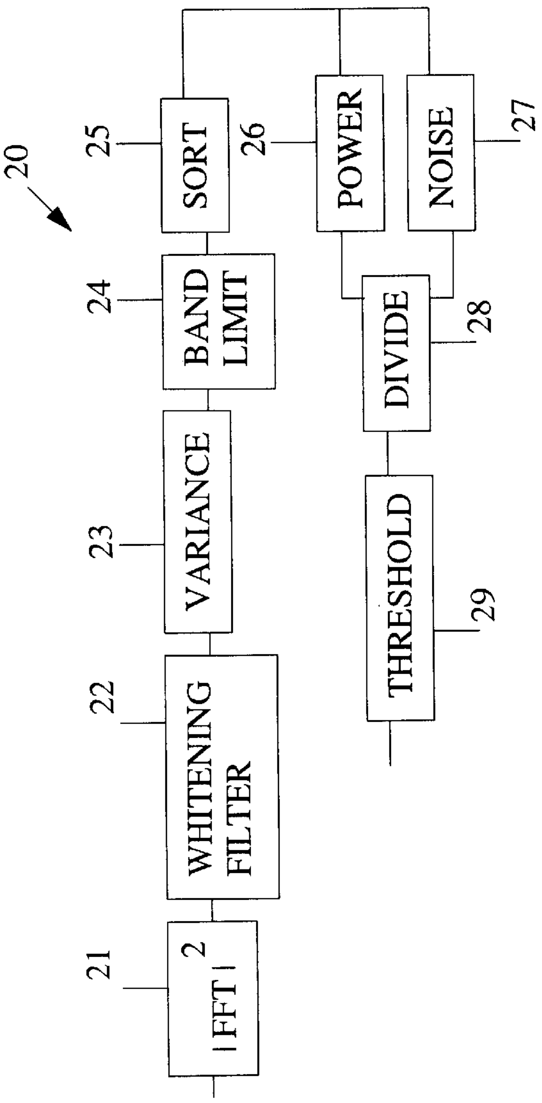
FIG. 2 (PRIOR ART)
FIG. 2 is an illustration of the prior art NP method.
Figure 3:
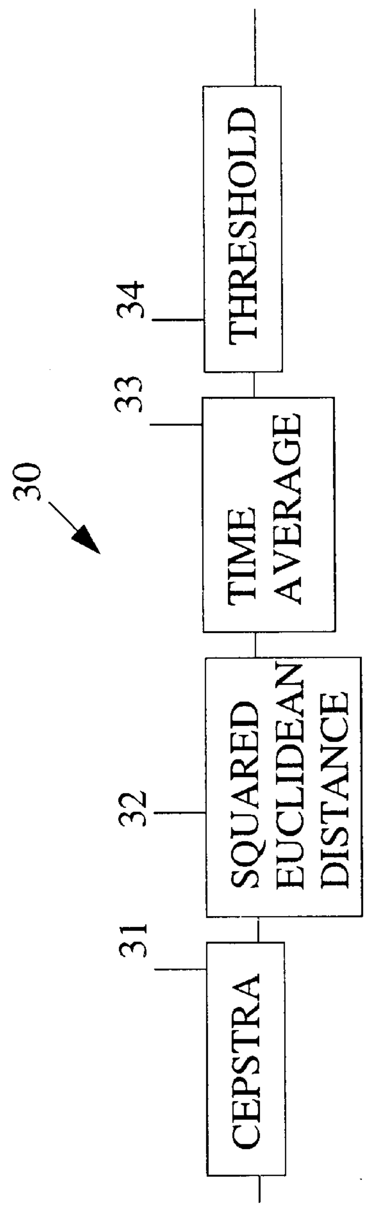
FIG. 3 (PRIOR ART)
FIG. 3 is an illustration of the prior art TALKATIVE method.
Figure 4:
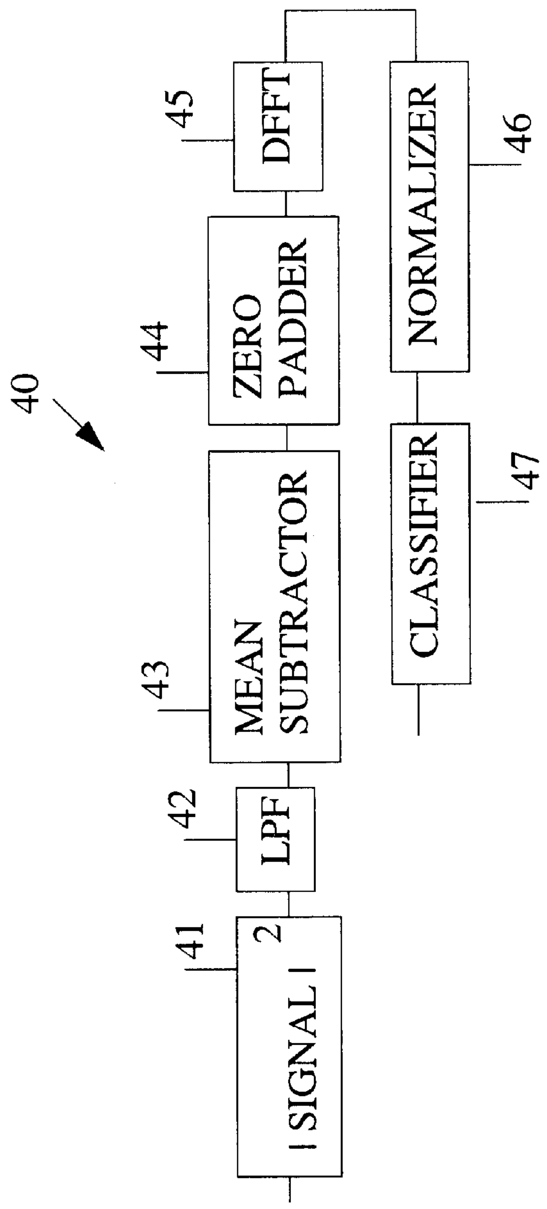
FIG. 4 is a schematic of the present invention.

The present invention is a device for and method of detecting voice activity. FIG. 4 is a schematic of the best mode and preferred embodiment of the present invention. The voice activity detector 40 receives a segment of a signal, computes feature vectors from the segment, and determines whether or not the segment is speech or non-speech. In the preferred embodiment, the segment is 0.5 seconds of a signal. In the preferred embodiment, the next segment analyzed is a 0.1 second increment of the previous segment. That is, the next segment includes the last 0.4 seconds of the first segment with an additional 0.1. seconds of the signal. Other segment sizes and increment schemes are possible and are intended to be included in the present invention. However, a segment length of 0.5 seconds was empirically determined to give the best balance between result accuracy and time window needed to resolve the syllable rate of speech.

The voice activity detector 40 receives the segment at an absolute value squarer 41. The absolute value squarer 41 finds the absolute value of the segment and then squares it. An arithmetic logic unit, a digital signal processor, or a microprocessor may be used to realize the function of the absolute value squarer 41.

The absolute value squarer 41 is connected to a low pass filter 42. The low pass filter 42 blocks high frequency components of the output of the absolute value squarer 41 and passes low frequency components of the output of the absolute value squarer 41. For speech purposes, low frequency is considered to be less than or equal to 60 Hz since the syllable rate of speech is within this range and, more particularly, within the range of 0 Hz to 10 Hz. The low pass filter 42 removes unnecessary high frequency components and simplifies subsequent computations. In the preferred embodiment, the low pass filter 42 is realized using a Hanning window. The output of the low pass filter 42 is often referred to as an Amplitude Modulated (AM) envelope of the original signal. This is because the high frequency, or rapidly oscillating, components have been removed, leaving only an AM envelope of the original segment.

The low pass filter 42 is connected to a mean subtractor 43. The mean subtractor 43 receives the AM envelope of the segment, computes the mean of the AM envelope, and subtracts the mean of the AM envelope from the AM envelope. Mean subtraction improves the ability of the voice activity detector 40 to discriminate between speech and certain modem signals and tones. The mean subtractor 43 may be realized by an arithmetic logic unit, a digital signal processor, or a microprocessor.

The mean subtractor 43 is connected to a zero padder 44. The zero padder 44 pads the output of the mean subtractor 43 with zeros out to a power of two if the output of the mean subtractor 43 is not a power of two. In the preferred embodiment, nine bit values are used as a compromise between accuracy of resolving frequencies and the desire to minimize computation complexity. The zero padder 44 may be realized with a storage register and a counter.

The zero padder 44 is connected to a Digital Fast Fourier Transformer (DFFF) 45. The DFFT 45 performs a Digital Fast Fourier Transform on the output of the zero padder 44 to obtain the spectral, or frequency, content of the AM envelop. It is expected that there will be a peak in the magnitude of the speech signal spectral components in the 0–10 Hz range, while the magnitude of the non-speech signal spectral components in the same range will be small. Establishing a spectral difference between speech signal and non-speech signal spectral components in the syllable rate range is a key goal of the present invention.

The DFFT 45 is connected to a normalizer 46. The normalizer 46 computes the normalized vector of the magnitude of the DFFT of the AM envelope, computes the mean of the normalized vector, computes the variance of the normalized vector, and computes the power ratio of the normalized vector. A normalized vector of a magnitude spectrum consists of the magnitude spectrum divided by the sum of all of the components of the magnitude spectrum. The normalized vector is a vector whose components are non-negative and sum to one. Therefore, the normalized vector may be viewed as a probability density. The normalized vector may be viewed as a probability density. The power ratio of the normalized vector is found by first determining the average of the components in the normalized vector and then dividing the largest component in the normalized vector by this average. The result of the division is the power ratio of the normalized vector. The mean, variance, and power ratio of the normalized vector constitutes the feature vector of the segment received by the voice activity detector 40. The normalizer 46 may be realized by an arithmetic logic unit, a microprocessor, or a digital signal processor.

The normalizer 46 is connected to a classifier 47. The classifier 47 receives the mean, variance, and power ratio of the segment computed by the normalizer 46 and compares it to precomputed models which represent the mean, variance, and power ratio of known speech and non-speech segments. The classifier 47 declares the feature vector of the segment to be of the type (i.e., speech or non-speech) of the precomputed model to which it matches most closely. Various classification methods are know by those skilled in the art. In the preferred embodiment, the classifier 47 performs the classification method of Quadratic Discriminant Analysis. The classifier 47 may determine whether the received segment is speech or non-speech based on the segment received or the classifier 47 may retain a number of, preferably five, consecutive 0.5 second segments and use them as votes to determine whether the 0.1 second interval common to these segments is speech or non-speech. Voting permits a decision every 0.1 seconds after the first number of frames are processed and improves decision accuracy. Therefore, voting is used in the preferred embodiment. The classifier 47 may be realized with an arithmetic logic unit, a microprocessor, or a digital signal processor.

Figure 5:
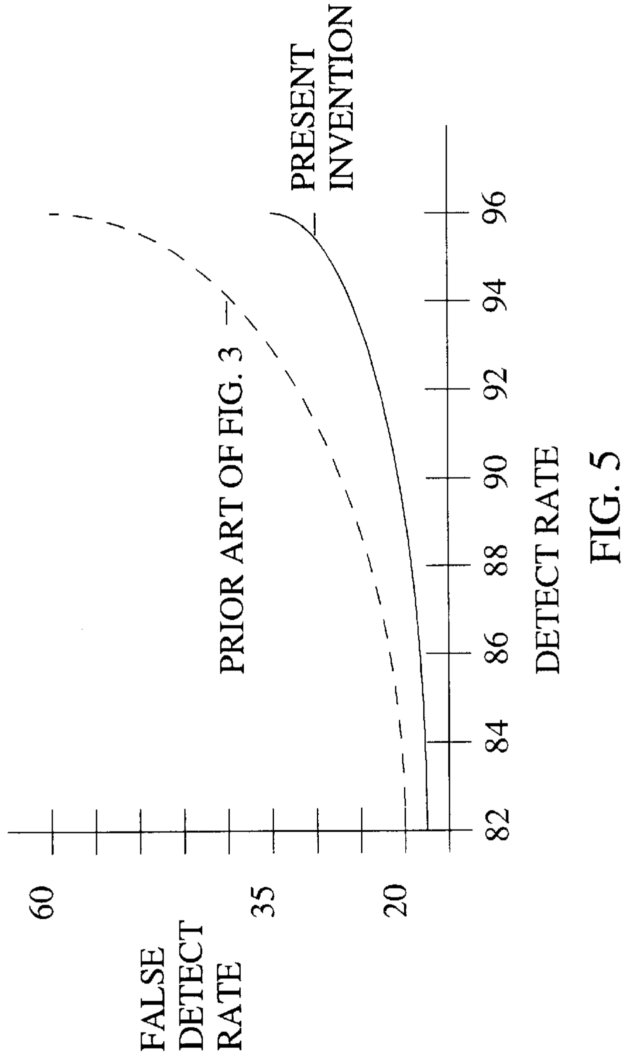
FIG. 5 is a graph comparing the present invention to TALKATIVE.

The performance of the voice activity detector 40 was compared against the TALKATIVE voice activity detector. FIG. 5 is a graph of the comparison which plots, on the y-axis, the rate at which voice activity was falsely detected versus the rate at which voice activity was correctly detected, on the x-axis. As can be seen from FIG. 5, the present invention significantly outperformed the TALKATIVE method.

Figure 6:
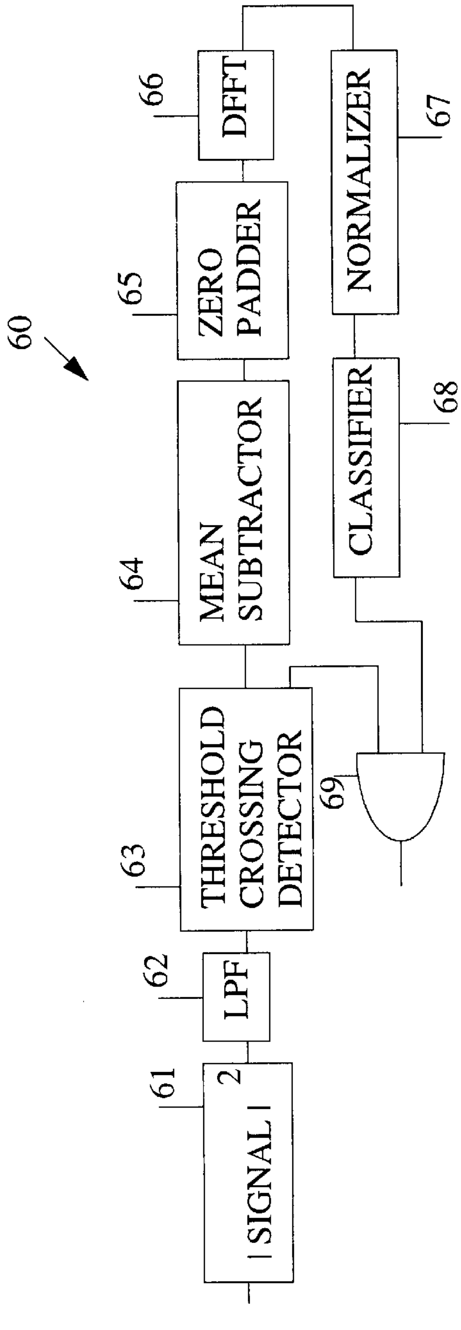
FIG. 6 is a schematic of an alternate embodiment of the present invention.

FIG. 6 is a schematic of an alternate embodiment of the present invention. The voice activity detector 60 of FIG. 6 is better able to identify music and quickly identify it as non-speech. The voice activity detector 60 does this by using the same circuit as the voice activity detector 40 of FIG. 4 and inserting therein a threshold-crossing detector 63. Each function of FIG. 6 performs the same function as its like-named counterpart of FIG. 4 and will not be re-described here. So, the segment is received by an absolute value squarer 61. The absolute value squarer 61 is connected to a low pass filter 62.

The low pass filter 62 is connected to the threshold-crossing detector 63. The threshold-crossing detector 63 counts the number of times the AM envelope dips below a user-definable threshold. In the preferred embodiment, the threshold is 0.25 times the mean of the AM envelope. If the segment presented to the threshold-crossing detector 63 does not cross the threshold then the segment is identified as non-speech and the segment need not be processed further. However, just because the segment crosses the threshold does not mean that the segment is speech. Therefore, processing of the segment continues if it crosses the threshold. The threshold-crossing detector 63 may have two outputs, one for indicating that the segment is non-speech and another for transmitting the segment received to a mean subtractor 64.

The output of the threshold-crossing detector 63 that transmits the segment received is connected to the mean subtractor 64. The mean subtractor 64 is connected to a zero padder 65. The zero padder 65 is connected to a DFFT 66. The DFFT 66 is connected to a normalizer 67. The normalizer 67 is connected to a classifier 68. The classifier 68 and the non-speech indicating output of the threshold-crossing detector 63 are connected to decision logic 69 for determining whether the segment is speech or non-speech. The decision logic 69 may be as simple as an AND gate. That is, the threshold-detector 63 and the classifier 68 may each use a logic value of 1 to indicate speech and a logic value of 0 to indicate non-speech. So, a logic value of 1 from both the threshold-crossing detector 63 and the classifier 68 is required to indicate that the segment is speech. However, logic levels of 0 from either the threshold-crossing detector 63 or the classifier 68 would indicate that the segment is non-speech. The same options that exist for the voice activity detector 40 of FIG. 4 are available to the voice activity detector 60 of FIG. 6.

What is claimed is:

1. A voice activity detector, comprising:

a) an absolute value squarer, having an input for receiving a signal, and having an output;

b) a low pass filter, having an input connected to the output of said absolute value squarer, and having an output;

c) a mean subtractor, having an input connected to the output of said low pass filter, and having an output;

d) a zero padder, having an input connected to the output of said mean subtractor, and having an output;

e) a Digital Fast Fourier Transformer, having an input connected to the output of said zero padder, and having an output;

f) a normalizer, having an input connected to the output of said Digital fast Fourier Transformer, and having an output; and g) a classifier, having an input connected to the output of said normalizer, and having an output.

2. A voice activity detector, comprising:

a) an absolute value squarer, having an input for receiving a signal, and having an output;

b) a low pass filter, having an input connected to the output of said absolute value squarer, and having an output;

c) a threshold-crossing detector, having a user-definable threshold, having an input connected to the output of said low pass filter, having a first output, and having a second output;

d) a mean subtractor, having an input connected to the first output of said zero crossing detector, and having an output;

e) a zero padder, having an input connected to the output of said mean subtractor, and having an output;

f) a Digital Fast Fourier Transformer, having an input connected to the output of said zero padder, and having an output;

g) a normalizer, having an input connected to the output of said Digital Fast Fourier Transformer, and having an output;

h) a classifier, having an input connected to the output of said normalizer, and having an output; and i) decision logic, having a first input connected to the second output of said zero crossing detector, having a second input connected to the output of said classifier, and having an output.

3. A method of detecting voice activity, comprising the steps of:

a) receiving a signal;

b) computing the absolute value of the signal;

c) squaring the result of the last step;

d) filtering the result of the last step to only pass low frequency components in the range of from 0–60 Hz;

e) computing the mean of the last step;

f) subtracting the mean computed in the last step from the result of step (d);

g) padding the result of the last step with zeros to form the next highest power of two of the result of the last step if the result of the last step is not already a power of two;

e) computing a Digital Fast Fourier Transform of the result of the last step;

f) normalizing the result of the last step;

g) computing a mean of the result of the last step;

h) computing a variance of the result of step (f);

i) computing a power ratio of the result of step (f);

j) classifying the results of step (g), step (h), and step (i) as a type of known speech and known non-speech to which the results of step (g), step (h), and step (i) most closely compares, where the known speech and the known non-speech are each identified by a mean, a variance and a power ratio.

4. The method of claim 3, wherein said step of receiving a signal is comprised of the step of receiving a 0.5 second segment of a signal, where said segment was incremented by 0.1 seconds from a next previous segment.

5. The method of claim 4, further including the steps of:

a) retaining a number of consecutive 0.5 second frames; and b) using the number of consecutive 0.5 second frames as votes to determine whether the 0.1 second interval common to the number of consecutive 0.5 second frames is speech or non-speech.

6. The method of claim 5, wherein said step of retaining a number of consecutive 0.5 second frames is comprised of the step of retaining five consecutive 0.5 second frames.

7. The method of claim 6, wherein said step of classifying the results of step (g), step (h), and step (i) is comprised of performing a Quadratic Discriminant Analysis.

8. The method of claim 7, further including counting the number of times the result of filtering crosses a user-definable threshold.

9. The method of claim 8, wherein said step of counting the number of zero threshold crossings is comprised of the step of counting the number of times the result of filtering crosses a user-definable threshold, where the threshold is defined as 0.25 times the mean of an AM envelope of the signal.

10. The method of claim 3, wherein said step of classifying the results of step (g), step (h), and step (i) is comprised of performing a Quadratic Discriminant Analysis.

11. The method of claim 3, further including counting the number of times the result of filtering crosses a user-definable threshold.

12. The method of claim 11, wherein said step of counting the number of zero threshold crossings is comprised of the step of counting the number of times the result of filtering crosses a user-definable threshold, where the threshold is defined as 0.25 times the mean of an AM envelope of the signal.

* * * * *